US005480546A

United States Patent [19]

Bergkvist et al.

[11] Patent Number: 5,480,546

[45] Date of Patent: Jan. 2, 1996

[54] ROTATING SCREEN DRUM WITH A STAINLESS LINING

[75] Inventors: Lennart Bergkvist, Forshaga; Sten Gustafsson, Karlstad; Kjell Lindblom, Karlstad; Jan Anderson, Karlstad; Rolf Ekholm, Karlstad; Ronny Höglund, Skoghall, all of Sweden

[73] Assignee: Kvaerner Pulping Technologies Aktiebolag, Karlstad, Sweden

[21] Appl. No.: 223,128

[22] Filed: Apr. 5, 1994

[30] Foreign Application Priority Data

Feb. 7, 1994 [SE] Sweden .................................. 9400385

[51] Int. Cl.[6] ..................................................... B01D 33/06

[52] U.S. Cl. .......................... 210/404; 210/359; 210/402; 210/498; 210/499; 55/400; 162/58; 209/270

[58] Field of Search ........................ 55/337, 400; 162/55, 162/58, 244; 209/270, 283, 284; 210/357, 359, 360.1, 380.1, 380.3, 402, 403, 404, 498, 499, 500.25, 512.1

[56] References Cited

U.S. PATENT DOCUMENTS 3,504,802 4/1970 Luthi ...................................... 210/404
4,248,716 2/1981 LaValley ................................ 210/402
5,265,447 11/1993 Bilodeau et al. ....................... 210/402

*Primary Examiner*—Robert A. Dawson
*Assistant Examiner*—David Reifsnyder
*Attorney, Agent, or Firm*—Michael D. Bednarek; Marks & Murase

[57] ABSTRACT

A screen dram for the dewatering and/or washing of cellulose pulp, comprises a first cylinder (2) made from non-stainless material, which is rotatable about its axis (5); a cylindrical screen plate (6) arranged coaxially on the outside of the first cylinder, but at a distance from it, and between the screen plate and the first cylinder an annular chamber (7) which can receive liquid which has passed through the screen plate, which chamber contains passages (26) which extend in the axial direction towards one or both ends of the drum for the withdrawal of the screen liquid. The chamber (7) is lined with stainless steel (8) in the form of one or more cylindrical plate sections (**8*a*, 8*b* . . . 8*n***). These, by virtue of shrink joints, can be joined to and bear in seal-tight arrangement against the cylindrical casing of the first cylinder. Preferably, the stainless steel contains at least 5% molybdenum.

17 Claims, 3 Drawing Sheets

ROTATING SCREEN DRUM WITH A STAINLESS LINING

TECHNICAL FIELD

The invention relates to a screen drum for the dewatering and/or washing of cellulose pulp, comprising a first cylinder made from non-stainless material, which is rotatable about its axis; a cylindrical screen plate arranged coaxially on the outside of the first cylinder, but at a distance from it, and between the screen plate and the first cylinder an annular chamber which can receive liquid which has passed through the screen plate, which chamber contains passages which extend in the axial direction towards one or both ends of the drum for the withdrawal of the screen liquid.

PRIOR ART

Washing and dewatering of cellulose pulp from the bleaching plants of pulp mills place great demands upon the construction material which is used in the apparatuses which are used to handle the bleached pulp. This applies for example, to a large extent, to wash filters, wash presses and therein incorporated components. Although chlorine bleaching, due to the high AOX-content of the waste liquids, has been replaced in some plants by chlorine-free bleaching methods, these are still under development and bleaching with chlorine or at least with chlorine compounds continues to be used in many plants. In the conversion of existing plants from chlorine-bleaching to more environment friendly bleaching methods, the pulp producer, moreover, often wishes to maintain the option of also being able to bleach with chlorine or with chlorine compounds. The equipment in such a bleaching line must therefore be able to withstand extreme load with regard to corrosion-resistance.

For a long time, stainless steels and acid-resistant steels have been used for apparatuses in bleaching plants of the pulp industries, above all austenitic stainless steels belonging to the 316-series, e.g. ASTM 316(SS2343) and 316L(SS2353), which contain 17–17.5 Cr, 11–12 Ni and 2.7 Mo, but also ferrite-austenitic stainless steels, e.g. ASTM S31 500(SS2376), which contains max. 0.030 C, 18.5 Cr, 5 Ni and 2.7 Mo. Steels of these or similar types have come to be used, inter alia, as material for screen drams in washing presses, not only for the relatively thin screen plate but also for the thick, heavy cylinder which supports the screen plate. It should be appreciated that these heavy components constructed in stainless steel are expensive.

Due the ever greater demands which are made with regard to corrosion-resistance, development has been directed, however, towards still more corrosion-resistant materials, such as super-alloys and also pure titanium. Even if only those parts which come into contact with the corrosive liquids are produced from these exclusive materials, the costs become very high. An alternative would be austenitic, acid-resistant steels containing at least 5% molybdenum. Examples of such steels are the steels which are produced by Avesta Sheffield AB and which are known under the registered trademarks 254SMO and 654SMO and which contain (254SMO) max. 0.020 C, 20 Cr, 18 Ni, 6.2 Mo, 0.7 Cu and 0.20 N, and (654SMO) max. 0.02 C, 2–4 Mn, 24 Cr, 22 Ni, 7.3 Mo, 0.5 C, 0.5 N, balance iron. These steels have very high corrosion-resistance against all those substances which are likely to occur in liquids of the pulp bleaching plants and are, from this viewpoint, attractive. These steels having a very high molybdenum content are also interesting from the cost viewpoint, at least in comparison with super-alloys and pure titanium. A drawback, however, is the risk of the high corrosion-resistance being partially lost due to phase transformations in connection with welding.

BRIEF DESCRIPTION OF THE INVENTION

One object of the invention is to provide a screen dram for the dewatering and/or washing of cellulose pulp, particularly a screen drum for wash presses, which combines adequate corrosion-resistance with acceptable production economy. A particular object of the invention, for components which are exposed to corrosion risk, is to be able to use an austenitic acid-resistant steel of the type which contains at least 5% molybdenum, without however excluding conventional austenitic stainless and acid-resistant steel from also being able to be used whenever the corrosion conditions allow.

A further object is to provide a screen drum whose components exposed to corrosion risk are joined together wholly or at least substantially without welding.

These and other objects can be achieved by virtue of the characteristics of the invention which are specified in the subsequent patent claims. Further characteristics and aspects and advantages of the invention can be derived from the following description of a preferred embodiment.

BRIEF DESCRIPTION OF DRAWINGS

In the following description of a preferred embodiment, reference will be made to appended illustrative drawings, in which.

DESCRIPTION OF A PREFERRED EMBODIMENT

Figure 1:
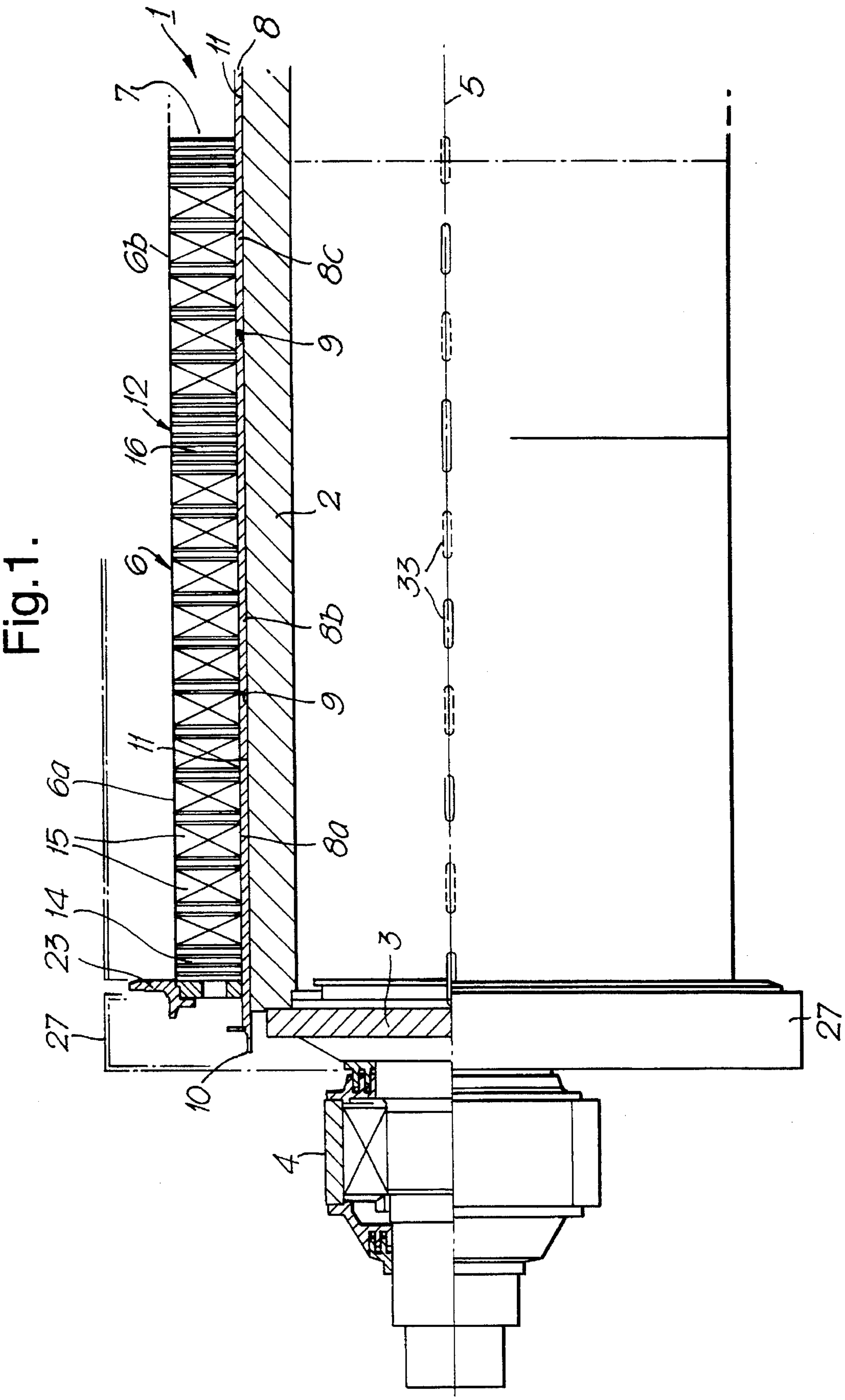
FIG. 1 shows a portion of the screen drum towards a longitudinal side, partially in section and having certain components omitted to allow the essential features to be better illustrated.
Figure 2:
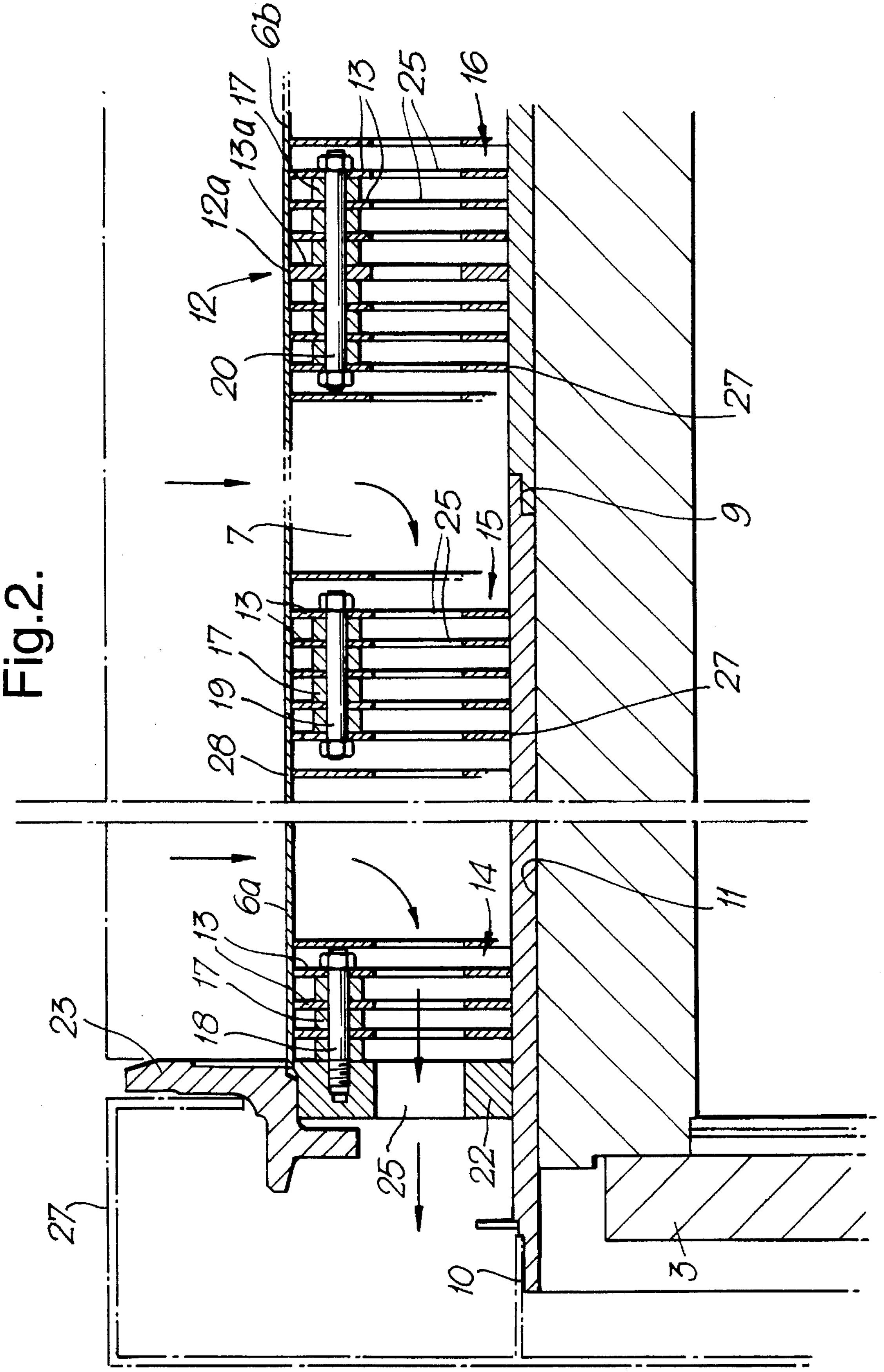
FIG. 2 shows a portion of FIG. 1 on a larger scale.
Figure 3:
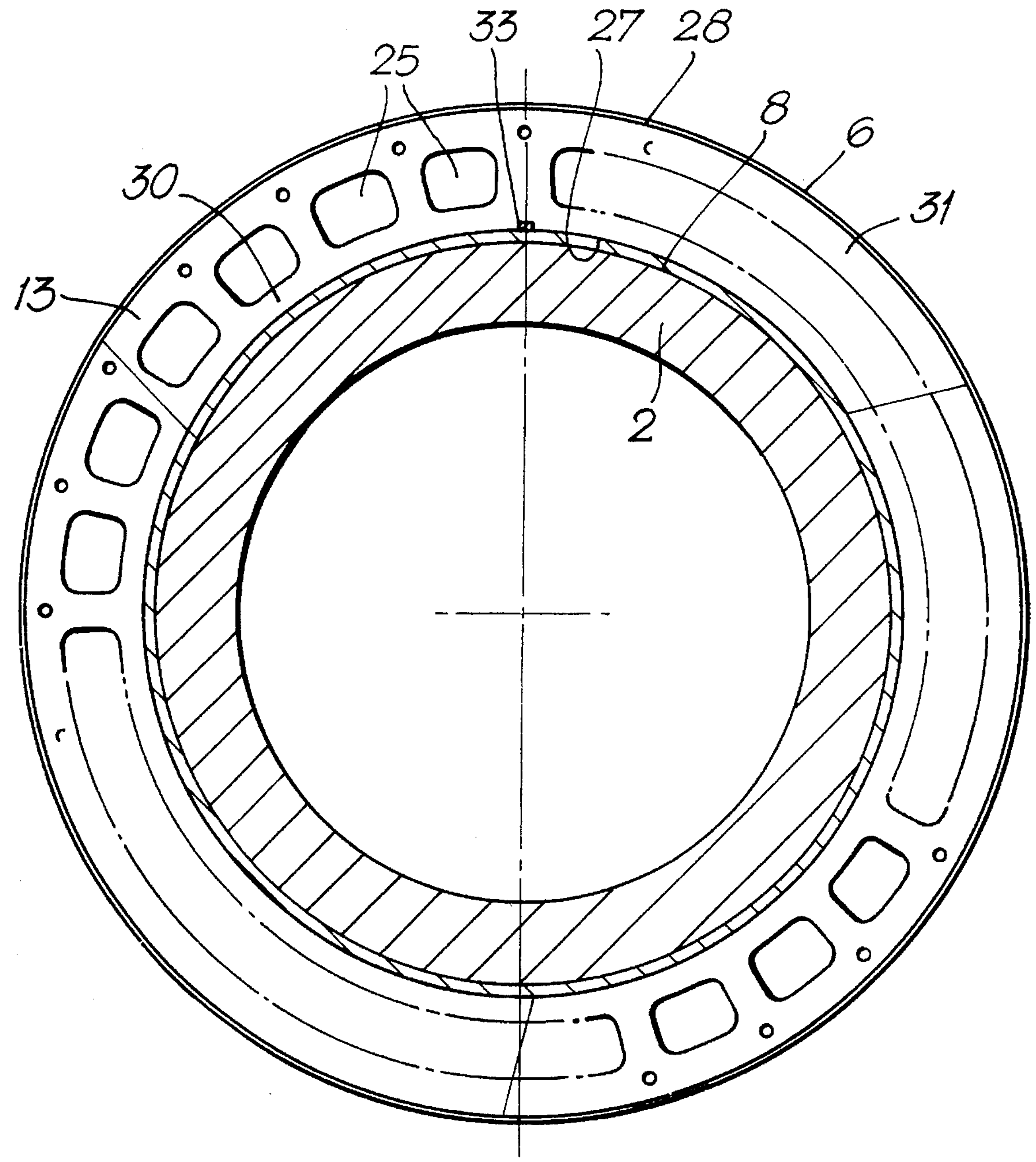
FIG. 3 is a view along the line III—III in FIG. 1.

With reference firstly to FIG. 1, a screen drum for a wash press is denoted generally by the numeral 1. A bearing first cylinder 2 consists of cast iron. It is supported at each end by a supporting disc 3. A drive motor is denoted by 4. Its rotary motion about the axle 5 is transmitted to the cast-iron cylinder 2 and hence to the screen drum 1 in its entirety via the supporting disc 3. Neither the beating cylinder 2 nor the supporting discs 3 come into contact with corrosive liquids and can therefore be produced from material having no great claims to corrosion-resistance, but having, on the other hand, good strength characteristics, such as east iron.

On the outside of the beating cast-iron cylinder 2, but at a distance from it, there is located a cylindrical screen plate 6, which is concentric with the cast-iron cylinder 2 and comprises a number of sections 6*a*, 6*b* . . . 6*n* disposed side by side. In the joint 12 between each neighbouring pair of sections there is a very small gap 12a. The screen plate 6 is made of acid-resistant steel of the type 254SMO and is relatively thin, i.e. less than 10 mm, preferably less than 7 mm. A preferred thickness is about 5 mm. Within the cylindrical screen plate 6 there is an annular chamber 7, which can receive liquid which has passed through the screen plate 6.

The chamber 7 is lined with stainless, acid-resistant steel of the type 254SMO. The lining has been denoted generally by 8. It comprises a large number of cylindrical plate sections, 8*a*, 8*b*, 8*c* . . . 8*n*, which are disposed side by side and partially overlapping each other in fish joints 9. The outermost sections, such as the section 8*a*, FIG. 1, extend beyond the supporting disc 3 and past the end of the cast-iron cylinder 2. The outer, bevelled edge portion of the outermost section 8*a* has been denoted by 10.

The lining 8, comprising the sections 8*a–n*, is joined to the bearing cast-iron cylinder 2 by a shrink joint (shrinkage fit). The sections 8*a–n* have been brought by the shrinkage into seal-tight adjoining contact with the outer, wholly smooth, cylindrical outer side 11 of the cast-iron cylinder 2. There are no further means for anchoring the lining 8 to the cylinder 2. The lining 8 is thus completely devoid of welds, rivets, screws or the like. Between the lining 8 and the cylindrical screen plate 6 there are located, in the chamber 7, spacer members. These spacer members consist of annular, thin plate discs or rings 13 disposed in a radial plane. The discs 13 are disposed in packs 14, 15, 16. The majority of these packs, such as the pack 15, contains five discs 13. The distance between neighbouring discs 13 in the packs is less than 50 mm, preferably less than 40 mm and more preferably less than 30 mm. The thickness of each individual disc or ring is less than 10 mm, preferably less than 7 mm and more preferably about 5 mm.

In the outermost pack 14, the outermost spacer member is by a stronger ring 22, this also being made of grade 254SMO. On the outside of the ring 22 there is located a sealing ring 23, this too made of 254SMO-grade steel. In the region of the joints 12, between the various screen plate sections 6*a*, 6*b* . . . 6*n*, there is located a disc pack containing seven discs. The centremost, which is denoted by 13*a*, is thicker than the other discs 13 and is disposed below the gap 12*a* in the joint 12, so that the gap is sealed. In each pack 14, 15, 16, the discs 13, 13*a* are held at a distance apart by spacer sleeves 17 and held together with the aid of screw connections 18, 19, 20. All discs 13, 13*a* and screws, nuts and spacer sleeves, like the lining 8 and the screen plate 6, are made of the austenitic acid-resistant, high-molybdenum steel 254SMO.

The disc packs 14, 15, 16 are joined to the lining 8 by shrink joints, which have been realized by the disc packs 14–16 having been shrink-fastened to the lining 8, which has previously been shrink-fastened to the beating cast-iron cylinder 2. The cylindrical screen plate 6, furthermore, is shrink-fitted to the disc packs 14–16. The sealing ring 23, too, is fixed by a shrink joint, to be more precise by shrink-fitted, to the ring 22, the outer edge portion of the screen plate 6 being clamped between the two rings 22 and 23.

In the discs 13 and the outer rings 22 there are made a considerable number of relatively large holes 25. The holes 25 have the same configuration and location in all discs 13, 13*a* and end rings 22 respectively, and the discs 13, 13*a* and the rings 22 in the various disc packs 14–16 are orientated such that the holes 25 are arranged in line with each other along the length of the screen drum 1. Longitudinal channels are thereby formed, which longitudinal channels extend through the chamber 7 along its entire length. The channels open out into an annular cabinet 26, which can be conventionally designed for the collection and withdrawal of the screen liquid which has passed through the screen plate 6 into the chamber 7.

The holes 25, furthermore, are disposed in the discs 13 and the rings 22 at a distance from both the inner and outer circumferential edges 27 and 28, respectively, of the discs 13 and rings 22. The inner circumferential edges 27 bear continuously against the outer side of the lining 8 and, correspondingly, the screen plate 6 bears against the continuous, circumferential outer edges 28 of the discs. Between the holes 25 and the inner edges 27 and between the holes 25 and the outer edges 28 there are thus located continuous bridges 30 and 31, respectively, which have sufficient radial extent to be able to absorb those tensile stresses in the material which arise due to the shrink-fitting of the disc packs 14–16 to the lining 8 and which enable a good anchorage of the disc packs to the lining 8 without the need for any fixing welds, screws or the like. The shrink joint can be complemented however by cotter joints between the disc packs 14–16 and the lining 8 to eliminate any risk of the disc packs 14–16, and hence the screen plate 6 also, coming loose from the lining 8 and rotating relative to this if the disc packs 14-16, after being shrink-fitted, were to be heated very rapidly compared with the lining 8, which is in intimate contact with the thick, beating cast-iron cylinder 2 and which thus constitutes a thermically more inert body. The cotters in the cotter joints have been denoted by 33.

Outside the screen plate 6, there is further provided, in a manner which is known per se, means for distributing for a pulp suspension in an inlet section, liquid-distribution boxes in a wash zone, a possible wash flap, a press roller etc. in the event of the screen drum forming part of a wash press. These parts, which can be conventionally designed, do not however constitute any part of the present invention and have not therefore been described in greater detail.

We claim:

1. A screen drum for the dewatering and/or washing of cellulose pulp, comprising:

a first cylinder made from non-stainless material, which is rotatable about an axis of the first cylinder;

a cylindrical screen arranged coaxially on the outside of the first cylinder, but at a distance from the first cylinder; and an annular chamber defined between the screen plate and the first cylinder for receiving liquid passing through the screen, which annular chamber contains passages which extend in an axial direction of the cylinder towards at least one end of the drum for withdrawal of liquid which has passed through the screen;

wherein said chamber is lined with sheet sections of stainless steel lining, disposed side by side in seal-tight arrangement on the first cylinder, wherein stainless steel spacer members are disposed in said chamber between the stainless steel lining on the first cylinder and the cylindrical screen, said spacer members comprising packs of annular discs provided with holes which form said axial passages for the withdrawal of said liquid which has passed through the screen, and wherein each of said annular discs have a bridge portion between each of said holes and an outer periphery of the disc and a bridge portion between each of said holes and an inner periphery of the disc.

2. The screen drum according to claim 1, wherein the disc packs are joined to and bear against the stainless steel lining through shrinkage fit.

3. The screen drum according to claim 1, wherein the stainless steel lining is joined to and bears against the first drum through shrinkage fit.

4. The screen drum according to claim 1, wherein the screen is joined to and bears against the disc packs through shrinkage fit.

5. The screen drum according to claim 1, wherein a thickness of each individual annular disc is less than 10 mm.

6. The screen drum according to claim 5, wherein the thickness of each individual annular disc is less than 7 mm.

7. The screen drum according to claim 6, wherein the thickness of each individual annular disc is about 5 mm.

8. The screen drum according to claim 1, wherein the inner and outer peripheries of the annular discs are continuous, the inner periphery bearing directly against the stainless steel lining by said shrinkage fit, and said screen bearing against the outer periphery through shrinkage fit.

9. The screen drum according to claim 1, wherein the cylindrical screen comprises a plurality of sections, which are disposed side by side and individually shrinkage fitted to the disc packs.

10. The screen drum according to claim 1, wherein said lining, the spacer members, and the screen are made of stainless steel containing at least 5% molybdenum.

11. The screen drum according to claim 1, wherein a distance between any adjacent annular discs in said packs of discs is less than 50 mm.

12. The screen drum according to claim 11, wherein the distance between any adjacent annular discs in said packs of discs is less than 40 mm.

13. The screen drum according to claim 12, wherein the distance between any adjacent annular discs in said packs of discs is less than 30 mm.

14. The screen drum according to claim 1, wherein a material thickness of the screen is less than 10 mm.

15. The screen drum according to claim 14, wherein the material thickness of the screen is less than 7 mm.

16. The screen drum according to claim 15, wherein the material thickness of the screen is about 5 mm.

17. The screen drum according to claim 1, wherein said screen drum is in combination with a wash press.

* * * * *